(12) United States Patent
Sumioka

(10) Patent No.: US 10,031,316 B2
(45) Date of Patent: Jul. 24, 2018

(54) VIBRATION TYPE DRIVING APPARATUS, INTERCHANGEABLE LENS AND IMAGING APPARATUS INCLUDING VIBRATION TYPE DRIVING APPARATUS, AND METHOD FOR ADJUSTING VIBRATION TYPE DRIVING APPARATUS

(71) Applicant: CANON KABUSHIKI KAISHA, Tokyo (JP)

(72) Inventor: Jun Sumioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/310,423

(22) PCT Filed: Apr. 28, 2015

(86) PCT No.: PCT/JP2015/002288
§ 371 (c)(1),
(2) Date: Nov. 10, 2016

(87) PCT Pub. No.: WO2015/174039
PCT Pub. Date: Nov. 19, 2015

(65) Prior Publication Data
US 2017/0082828 A1    Mar. 23, 2017

(30) Foreign Application Priority Data

May 14, 2014  (JP) .................................. 2014-100847
Apr. 3, 2015  (JP) .................................. 2015-077211

(51) Int. Cl.
*G02B 7/08* (2006.01)
*G02B 7/04* (2006.01)
(Continued)

(52) U.S. Cl.
CPC ................. *G02B 7/08* (2013.01); *G02B 7/04* (2013.01); *G03B 3/10* (2013.01); *G03B 5/00* (2013.01);
(Continued)

(58) Field of Classification Search
CPC .......... G02B 7/08; G02B 7/04; H04N 5/2254; H04N 5/2253; H02N 2/065; H02N 2/142;
(Continued)

(56) References Cited

U.S. PATENT DOCUMENTS

2009/0153966 A1* 6/2009 Matsumoto ............ G03B 17/00
359/508
2014/0077664 A1* 3/2014 Ogura ................ G01C 19/5712
310/370
(Continued)

FOREIGN PATENT DOCUMENTS

EP    2393136 A2    12/2011
JP    H04185288 A    7/1992
(Continued)

*Primary Examiner* — Gevell Selby
(74) *Attorney, Agent, or Firm* — Canon U.S.A., Inc. IP Division

(57) ABSTRACT

A vibration type driving apparatus includes a first vibrator including an electro-mechanical energy conversion element and configured to be in pressure contact with a driven member, a second vibrator including an electro-mechanical energy conversion element and configured to be in pressure contact with the driven member, and a first electric element connected in series with the second vibrator. The first vibrator is connected to a driving circuit, the second vibrator and the first electric element are connected in parallel with the first vibrator, the second vibrator is connected to the driving circuit via the first electric element, and a resonance frequency f of the first vibrator and a resonance frequency f2 of the second vibrator satisfy a relationship f1<f2.

21 Claims, 13 Drawing Sheets

(51) Int. Cl.
| | |
|---|---|
| *G03B 5/00* | (2006.01) |
| *H02N 2/02* | (2006.01) |
| *H02N 2/06* | (2006.01) |
| *H02N 2/10* | (2006.01) |
| *H02N 2/14* | (2006.01) |
| *G03B 3/10* | (2006.01) |
| *H04N 5/225* | (2006.01) |
| *H02N 2/00* | (2006.01) |

(52) U.S. Cl.
CPC ............ *H02N 2/026* (2013.01); *H02N 2/062* (2013.01); *H02N 2/065* (2013.01); *H02N 2/103* (2013.01); *H02N 2/142* (2013.01); *H04N 5/2253* (2013.01); *H04N 5/2254* (2013.01); *G03B 2205/0061* (2013.01); *H02N 2/0015* (2013.01)

(58) Field of Classification Search
CPC ...... H02N 2/103; H02N 2/062; H02N 2/0015; H02N 2/026; G03B 3/10; G03B 5/00; G03B 2205/0061

See application file for complete search history.

(56) References Cited

U.S. PATENT DOCUMENTS

| | | | |
|---|---|---|---|
| 2014/0145649 A1* | 5/2014 | Atsuta | H02N 2/103 318/116 |
| 2014/0191691 A1* | 7/2014 | Kudo | H02N 2/0015 318/116 |

FOREIGN PATENT DOCUMENTS

| | | |
|---|---|---|
| JP | 2001136764 A | 5/2001 |
| JP | 2009225503 A | 10/2009 |
| WO | 2012026079 A1 | 3/2012 |
| WO | 2015098800 A1 | 7/2015 |

\* cited by examiner

[Fig. 1]
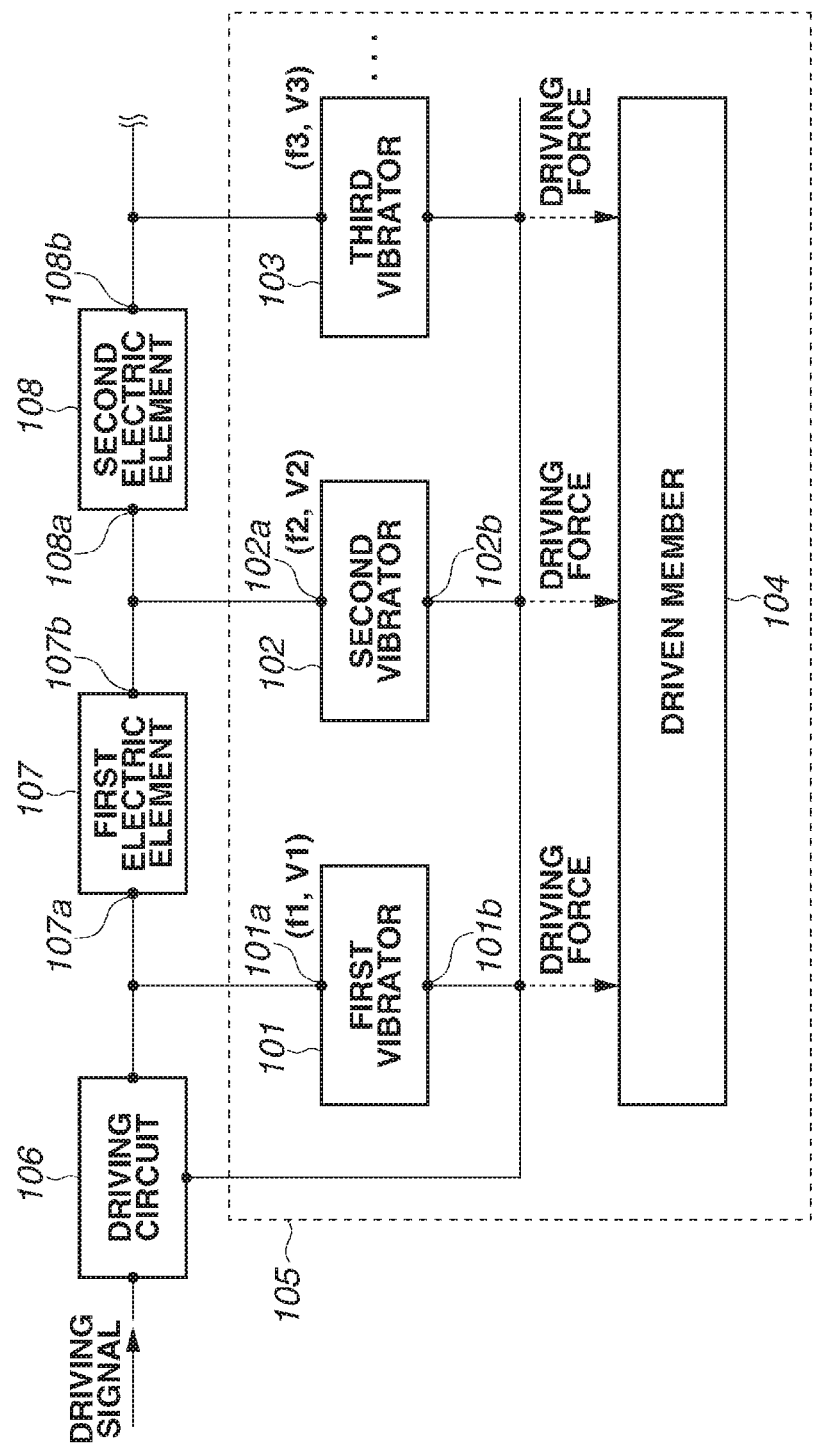

[Fig. 2A]
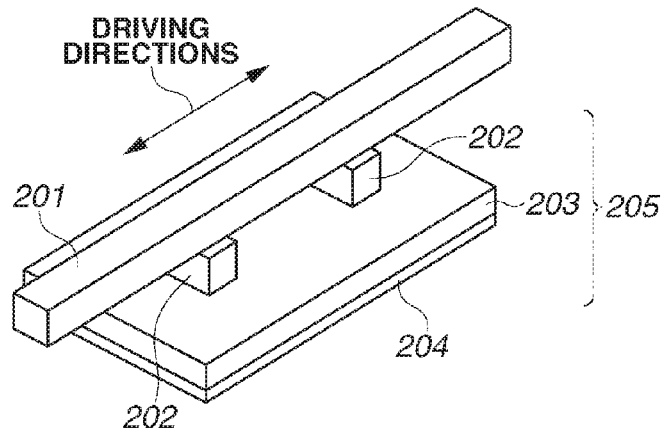
[Fig. 2B]
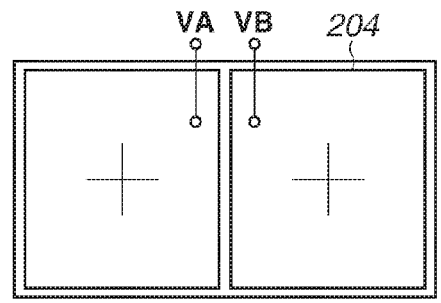
[Fig. 2C]
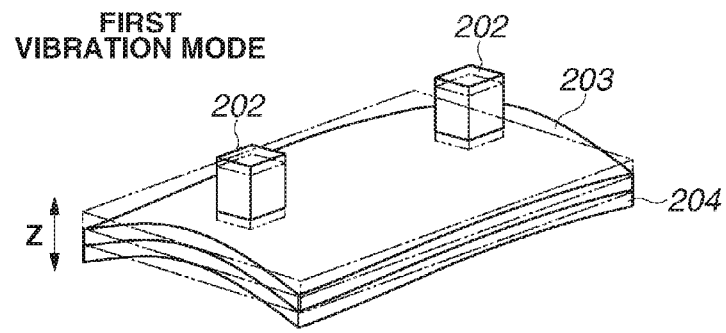
[Fig. 2D]
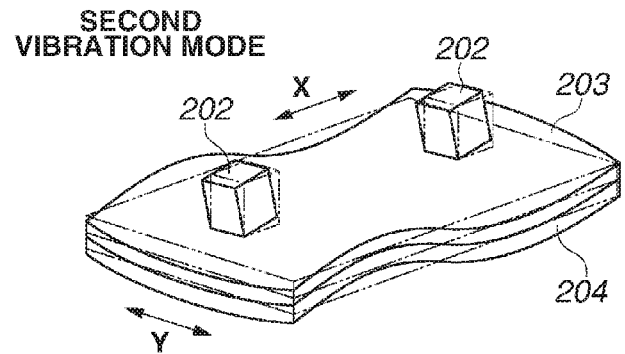

[Fig. 3]
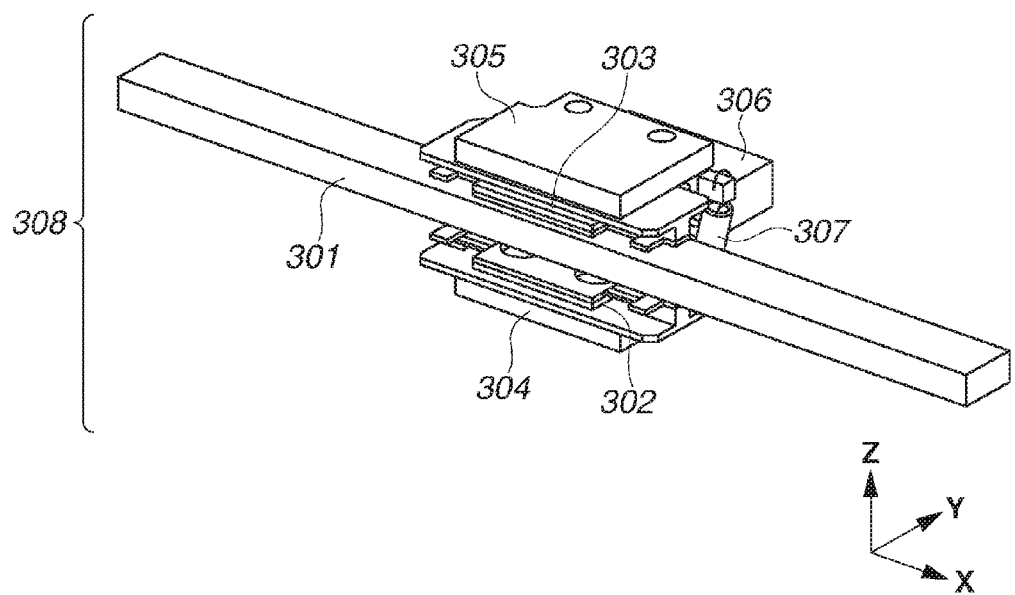

[Fig. 4]
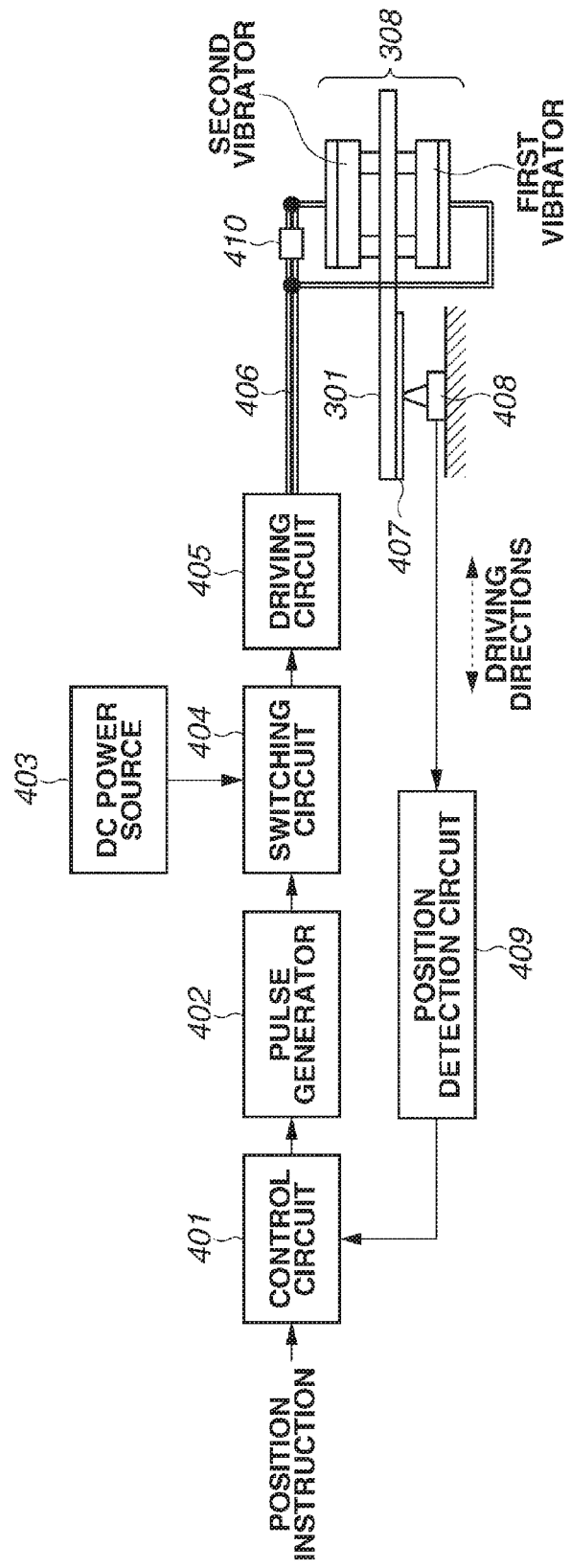

[Fig. 5]
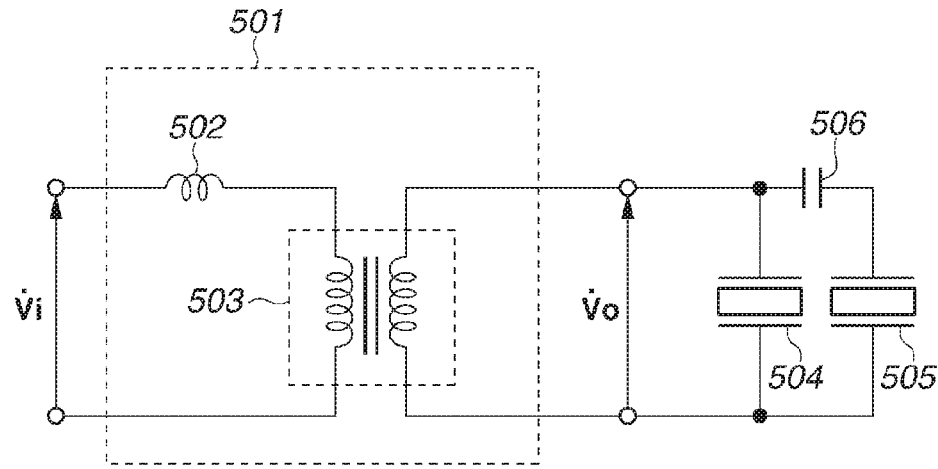
[Fig. 6A]
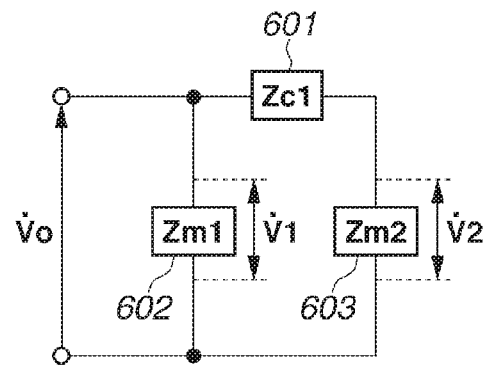
[Fig. 6B]
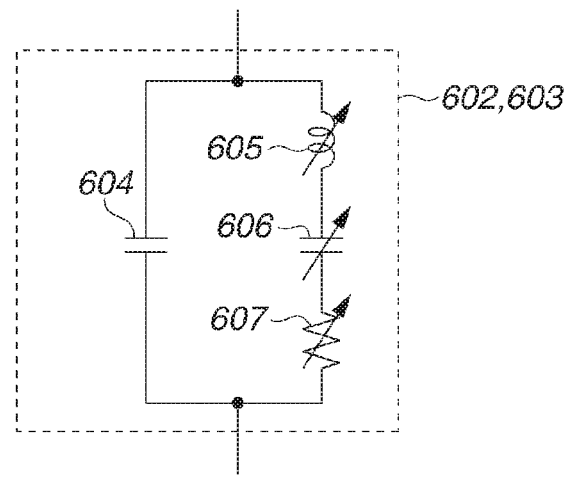

[Fig. 7A]
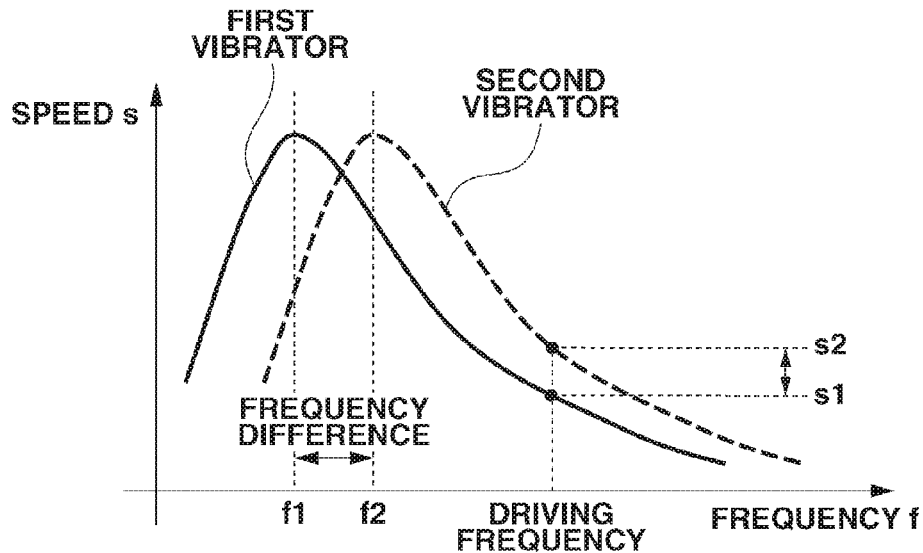
[Fig. 7B]
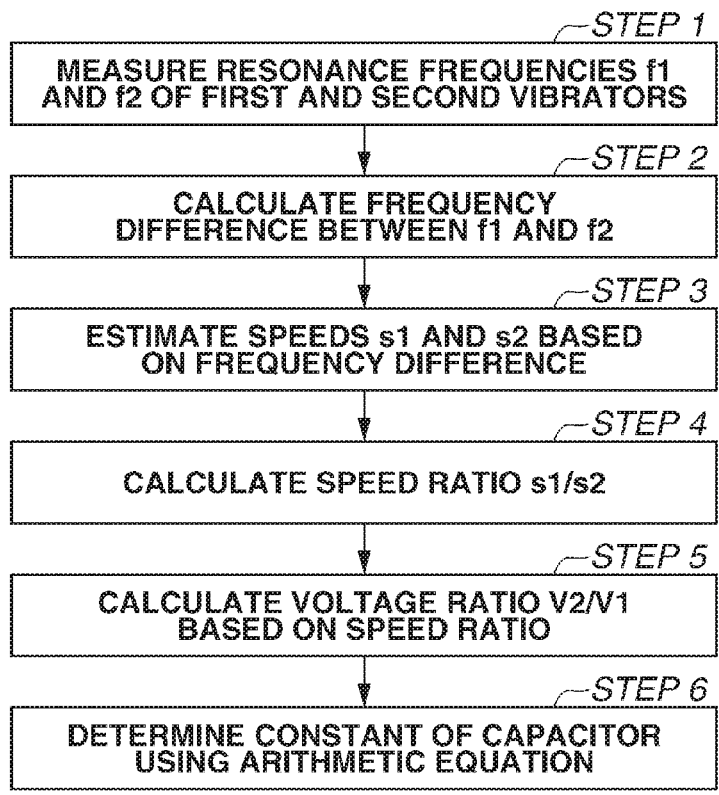

[Fig. 8]
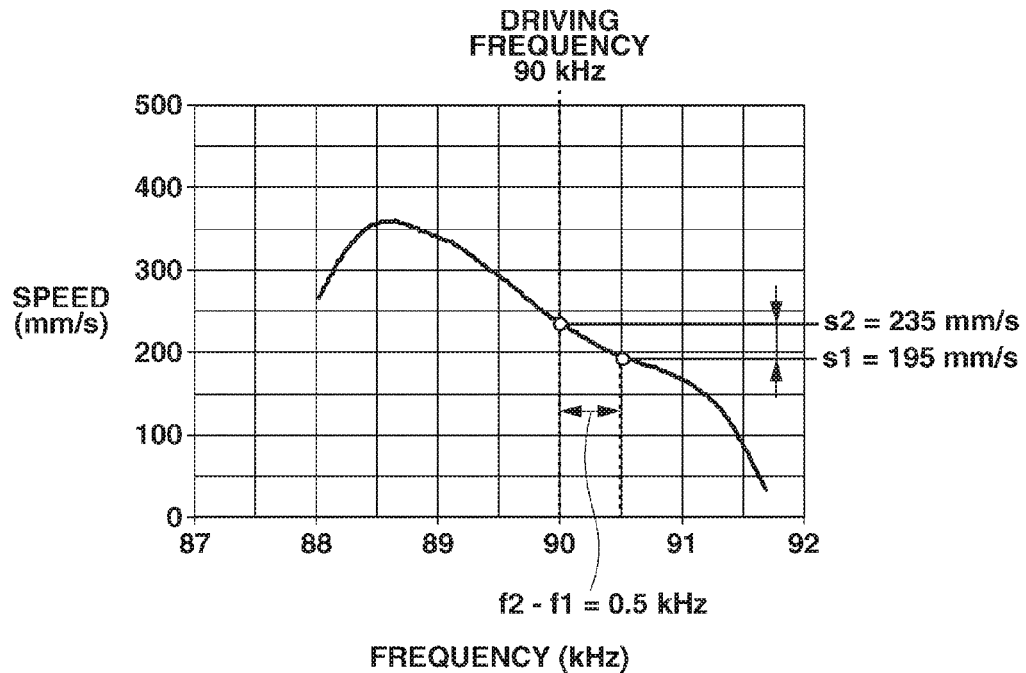
[Fig. 9A]
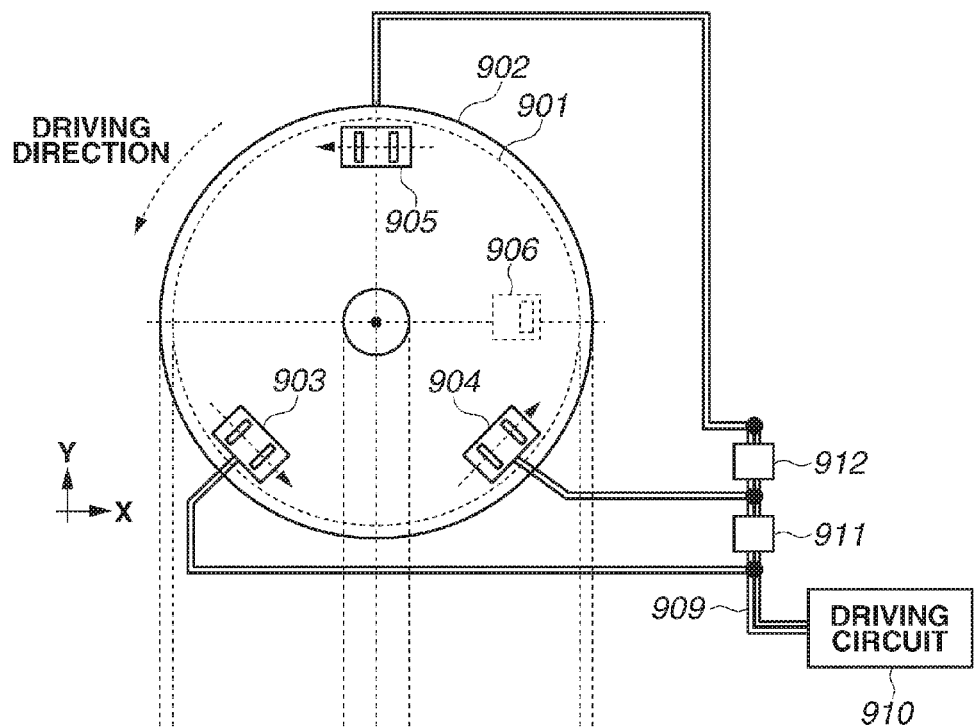

[Fig. 9B]
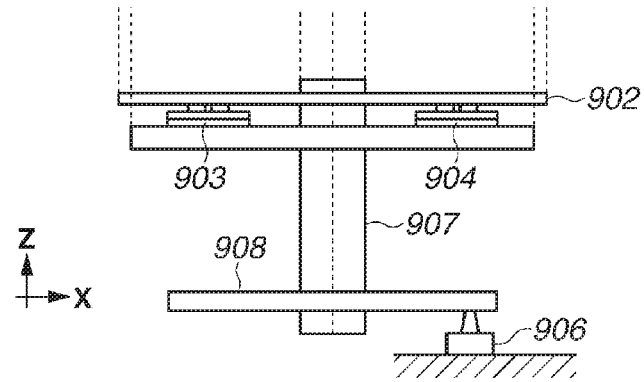
[Fig. 10]
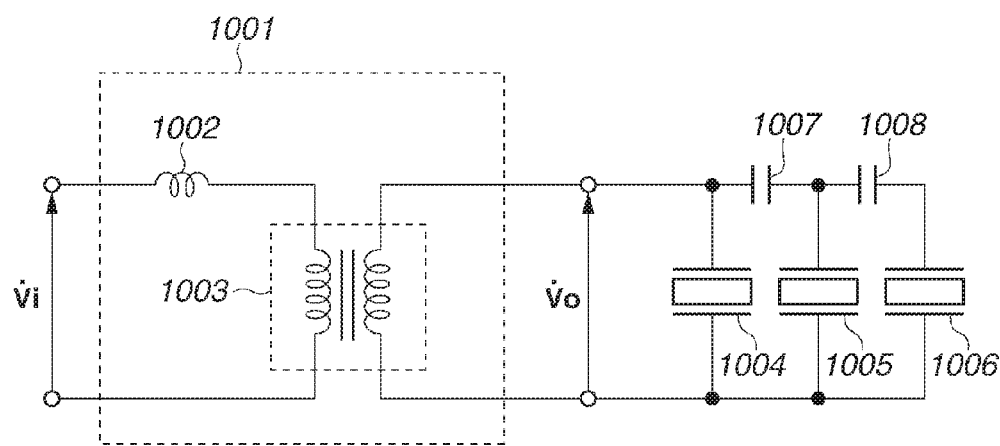
[Fig. 11]
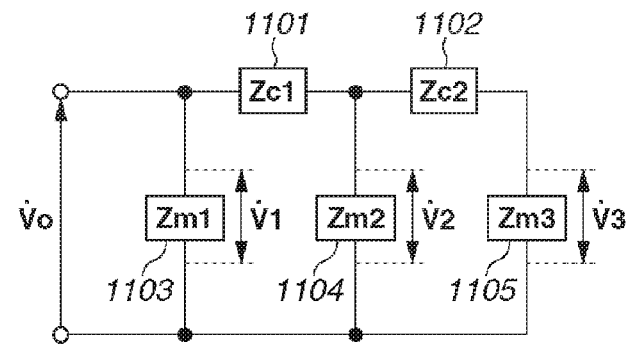

[Fig. 12A]
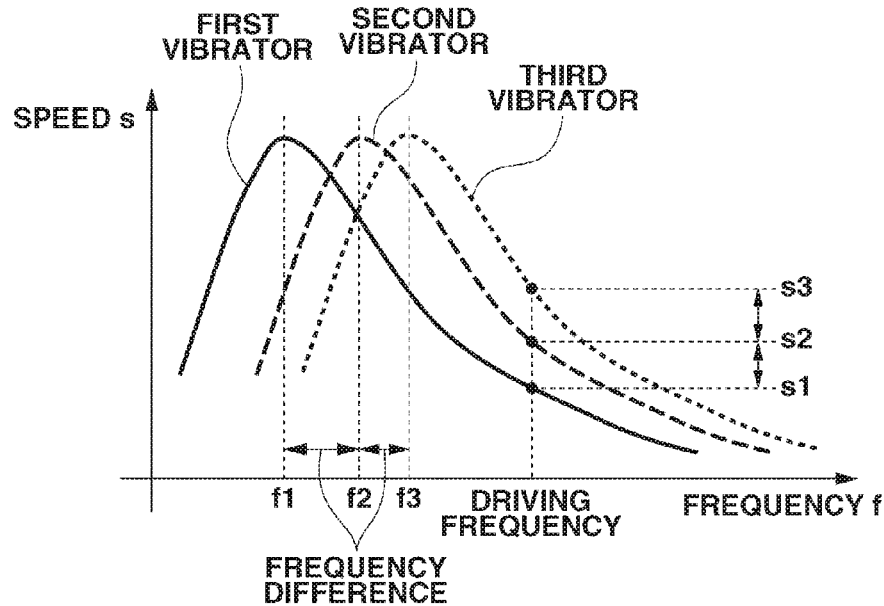
[Fig. 12B]
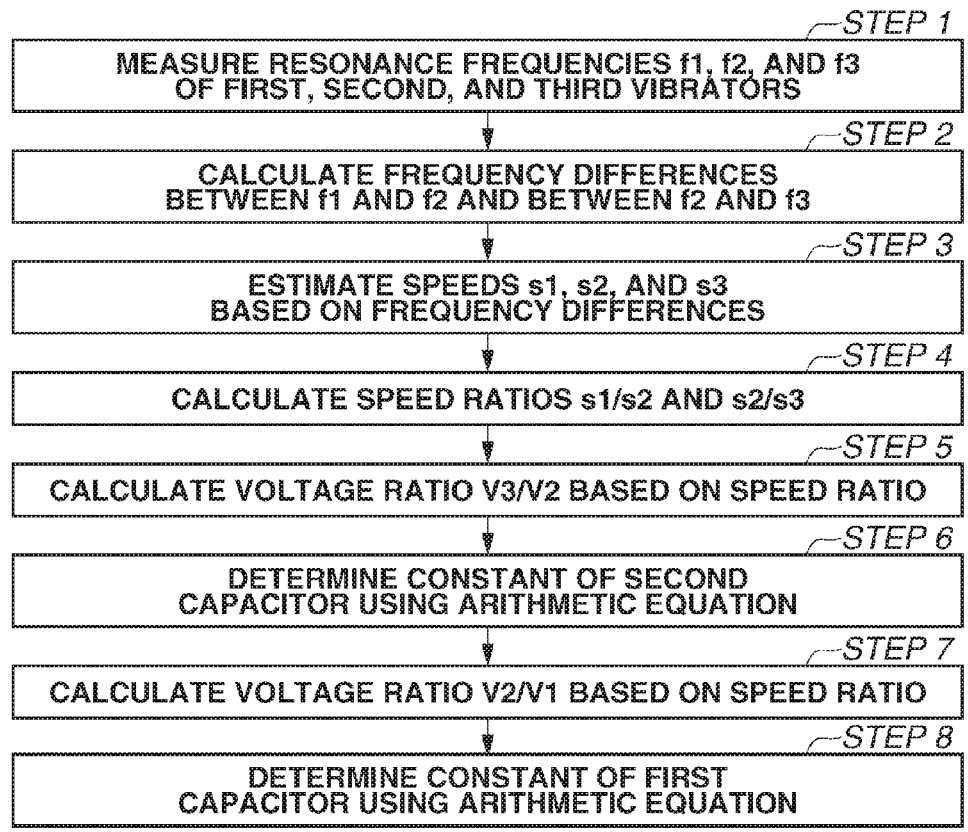

[Fig. 13]
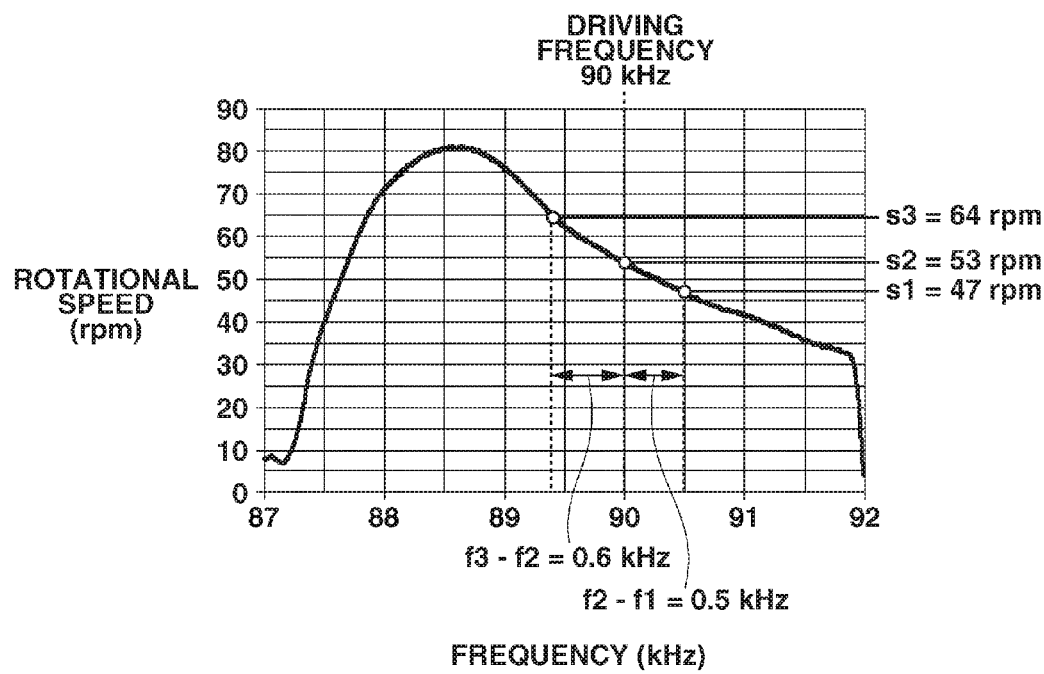
[Fig. 14A]
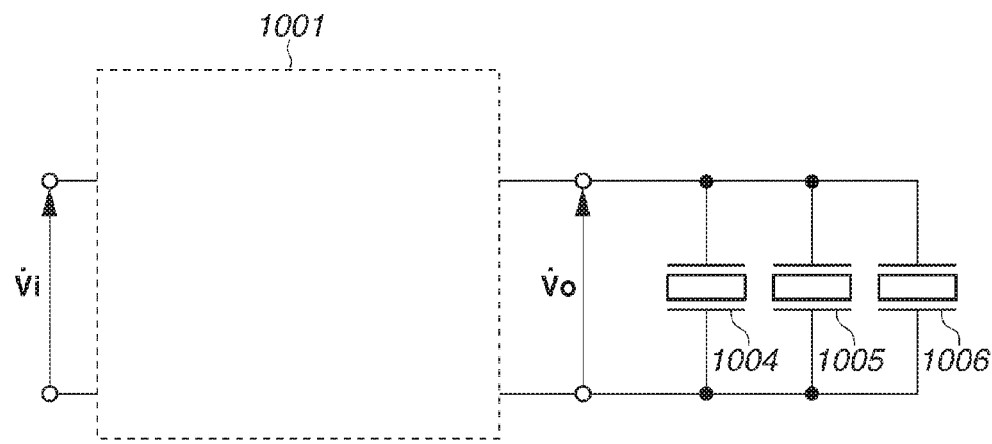

[Fig. 14B]
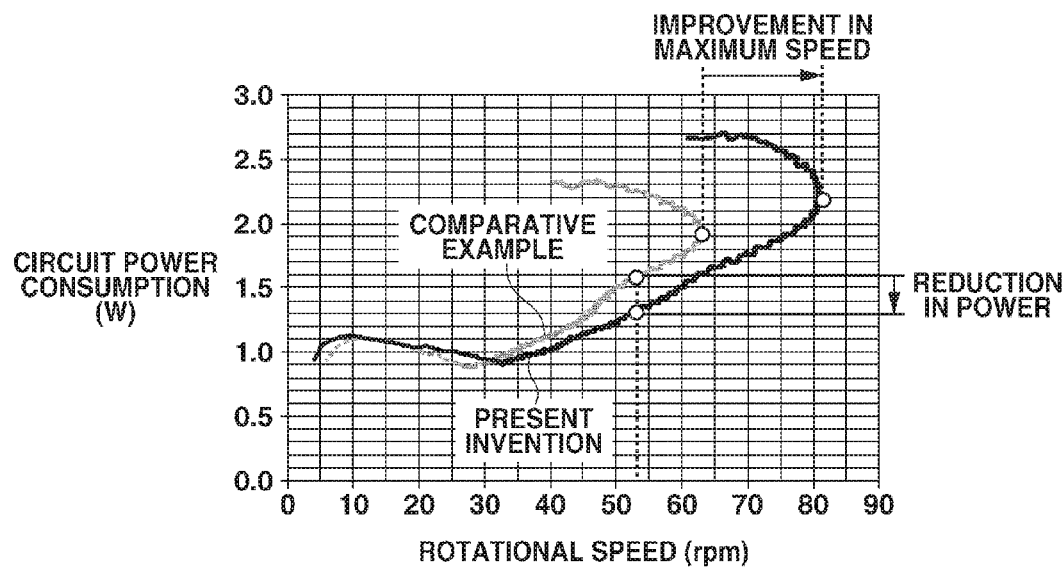
[Fig. 15A]
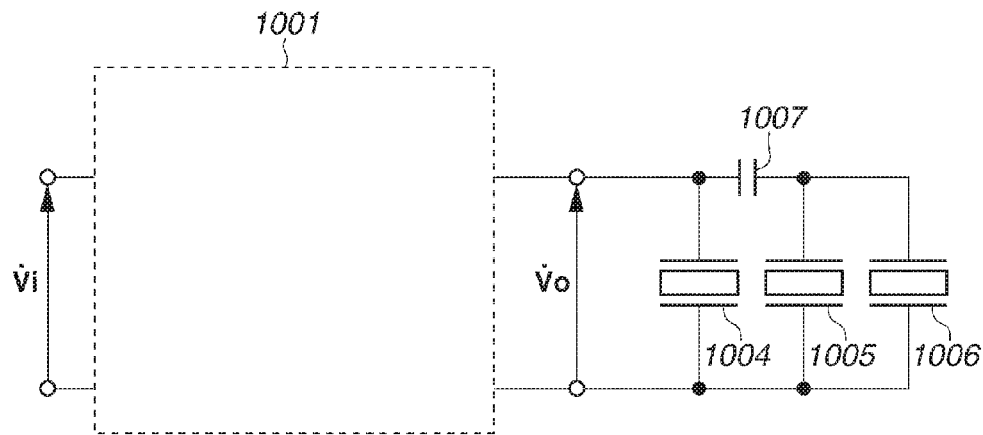
[Fig. 15B]
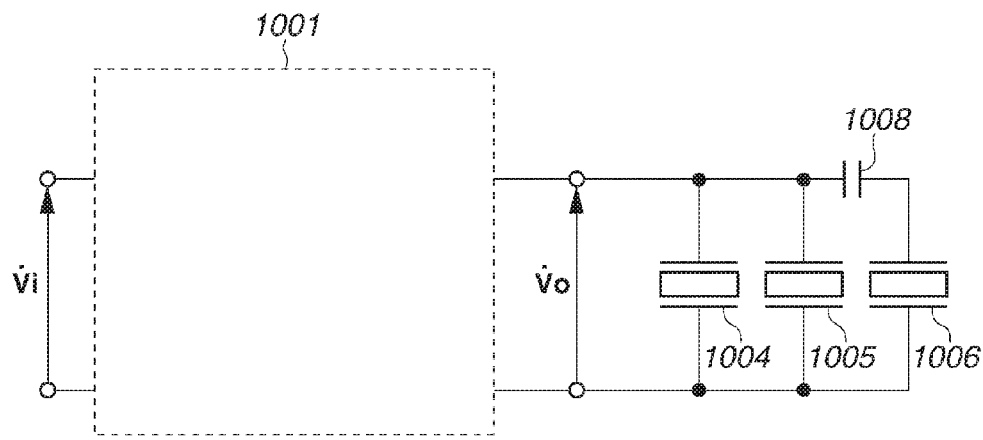

[Fig. 16A]
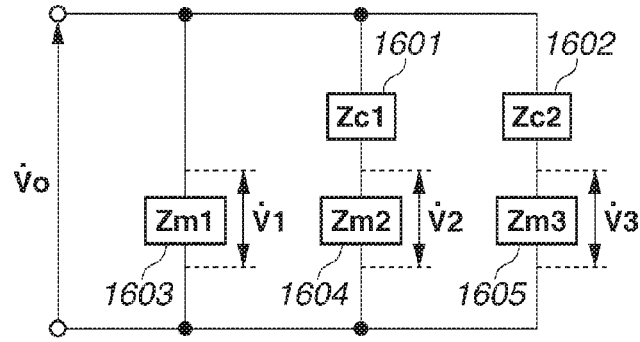
[Fig. 16B]
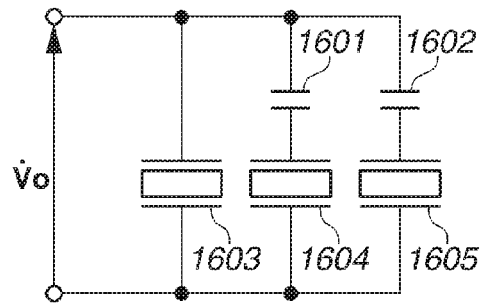
[Fig. 17A]
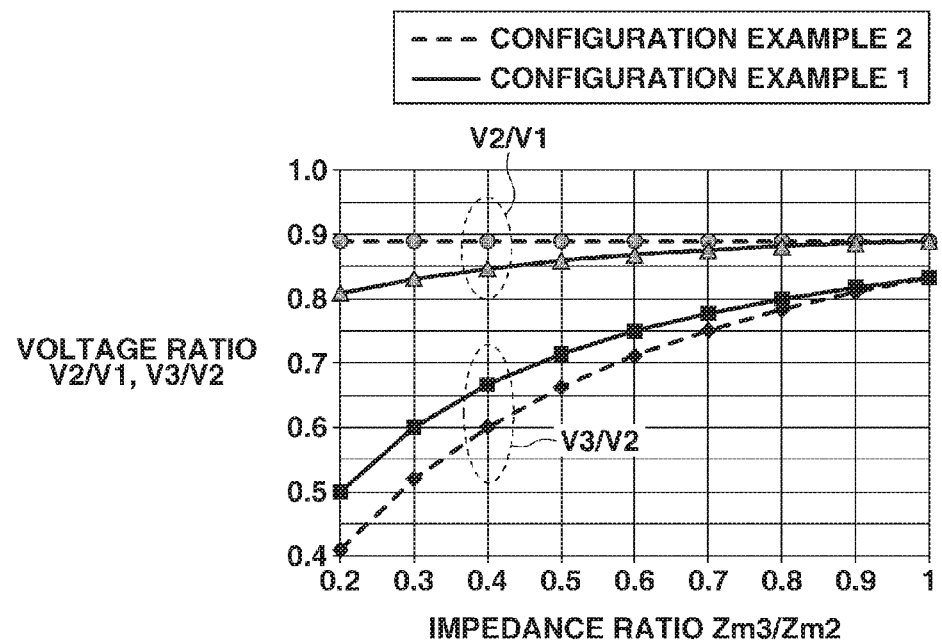

[Fig. 17B]
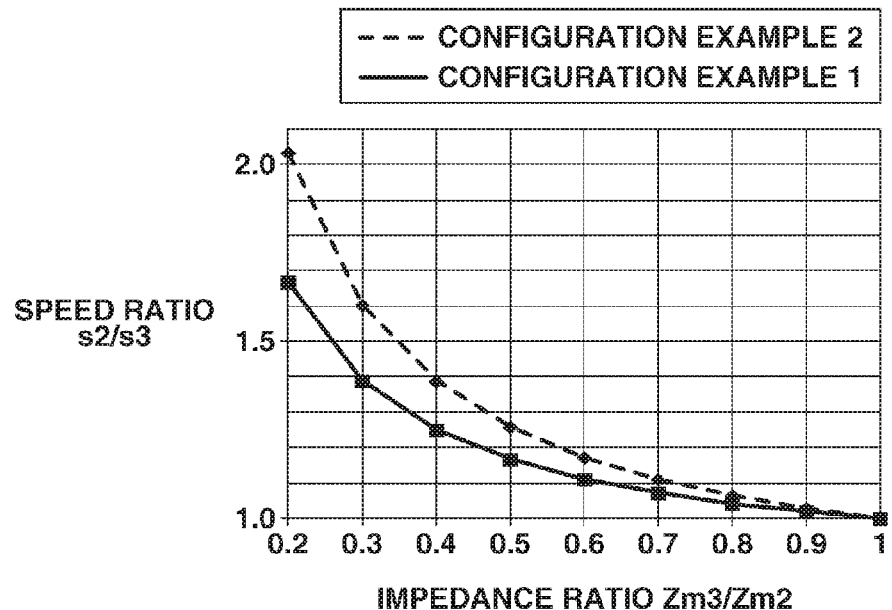
[Fig. 18]
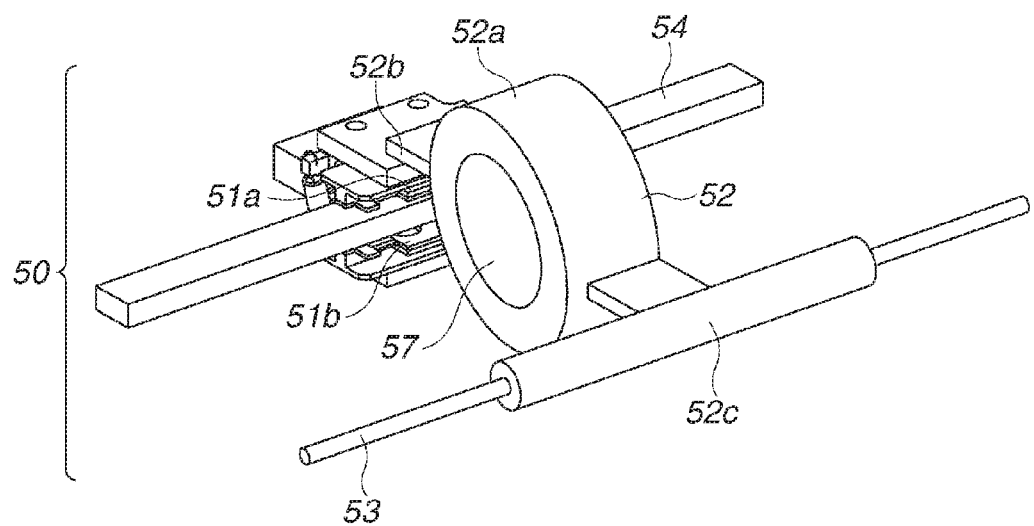

VIBRATION TYPE DRIVING APPARATUS, INTERCHANGEABLE LENS AND IMAGING APPARATUS INCLUDING VIBRATION TYPE DRIVING APPARATUS, AND METHOD FOR ADJUSTING VIBRATION TYPE DRIVING APPARATUS

TECHNICAL FIELD

The present disclosure relates to a vibration type driving apparatus, an inter-changeable lens and an imaging apparatus including the vibration type driving apparatus, and a method for adjusting the vibration type driving apparatus, for example.

BACKGROUND ART

A vibration wave motor serving as an example of a vibration type actuator is a non-electromagnetic driving type motor configured to generate, by applying an alternating voltage to an electro-mechanical energy conversion element such as a piezoelectric element coupled to an elastic member, high-frequency vibration in the piezoelectric element, and to output the generated vibration energy as a continuous mechanical motion.

A vibration type driving apparatus including a vibration type motor is used for automatic focus driving of a camera, for example. Highly-precise positioning con required for the automatic focus driving, so position feedback control using a position sensor is performed. A speed of the vibration type motor can be controlled by adjusting a frequency or a drive pulse width of a driving signal applied to a piezoelectric element, a phase difference between two driving signals, or the like. For example, the closer a driving frequency comes to a resonance frequency of the piezoelectric element, the larger vibration amplitude becomes. Thus, a lens serving as a driving target can be driven at high speed.

In recent years, there have been increasing needs for driving a heavier target at higher speed. As one technical solution thereof, a vibration type motor using a plurality of vibrators has been proposed. An issue in the vibration type motor using the plurality of vibrators lies in that the vibrators differ from each other in speed because they differ in resonance frequency due to individual variation. To correct the speed difference, a driving circuit may be individually provided to adjust a driving frequency for each of the vibrators. However, the cost of the driving circuit increases. Therefore, in order to drive the plurality of vibrators at the same speed using a common driving circuit, the driving circuit needs to be devised in some way.

PTL 1 discusses a driving circuit that drives a plurality of vibration type motors with the same rotation number by one transformer boosting circuit. To make the rotation number uniform, the technique discussed therein adjusts a driving voltage applied to each of the vibration type motors, using capacitance division of a capacitor.

PTL 2 similarly discusses driving a plurality of vibrators by one transformer driving circuit. For the purpose of performing impedance matching for vibrators having different resonance frequencies by one transformer boosting circuit, different reactance elements are respectively connected to the vibrators. An electric resonance frequency can be adjusted according to each of the vibrators. Thus, a circuit constant of a transformer can be used without being changed.

CITATION LIST

Patent Literature

PTL 1: Japanese Patent Application Laid-Open No. 04-185288
PTL 2: Japanese Patent Application Laid-Open No. 2001-136764

SUMMARY OF INVENTION

Solution to Problem

As disclosed herein, a vibration type driving apparatus includes a first vibrator including an electro-mechanical energy conversion element and configured to be in pressure contact with a driven member, a second vibrator including an electro-mechanical energy conversion element and configured to be in pressure contact with the driven member, and a first electric element connected in series with the second vibrator. The first vibrator is connected to a driving circuit, the second vibrator and the first electric element are connected in parallel with the first vibrator, the second vibrator is connected to the driving circuit via the first electric element, and a resonance frequency $f1$ of the first vibrator and a resonance frequency $f2$ of the second vibrator satisfy a relationship $f1<f2$.

Also disclosed herein is a method for adjusting a vibration type motor including a first vibrator including an electro-mechanical energy conversion element and a second vibrator including an electro-mechanical energy conversion element and having a resonance frequency that is equal to or larger than a resonance frequency of the first vibrator, the first vibrator and the second vibrator being configured to be in pressure contact with one driven member, includes obtaining a speed ratio of the first vibrator and the second vibrator based on a difference in resonance frequency between the first vibrator and the second vibrator, calculating, based on the speed ratio, a voltage ratio of voltages respectively applied to the first vibrator and the second vibrator, and obtaining a circuit constant of a first electric element based on the voltage ratio. The first vibrator, the second vibrator, and the first electric element are arranged so that the first vibrator and the second vibrator are connected in parallel in this order from a driving circuit of the vibration type motor, the first electric element and the second vibrator are connected in series, and the second vibrator is connected to the driving circuit via the first electric element.

In the present specification, a vibration type motor includes at least a vibrator and a driven member, and a vibration type driving apparatus includes at least a vibrator and a driving circuit of the vibrator.

Further features of the present invention will become apparent from the following description of exemplary embodiments with reference to the attached drawings.

BRIEF DESCRIPTION OF DRAWINGS

FIG. 1 illustrates a concept of a vibration type driving apparatus.
FIG. 2A illustrates a drive principle of a vibration type linear drive motor.
FIG. 2B illustrates a drive principle of a vibration type linear drive motor.
FIG. 2C illustrates a drive principle of a vibration type linear drive motor.

FIG. 2D illustrates a drive principle of a vibration type linear drive motor.

FIG. 3 is a perspective view of a vibration type motor including two vibrators.

FIG. 4 illustrates a position control system of a vibration type driving apparatus.

FIG. 5 illustrates a specific configuration example of a circuit including a driving circuit, a plurality of vibrators, and an electric element.

FIG. 6A illustrates a method for calculating voltages V1 and V2 respectively applied to two vibrators.

FIG. 6B illustrates a method for calculating voltages V1 and V2 respectively applied to two vibrators.

FIG. 7A is a diagram illustrating a relationship between frequencies f and speeds s of two vibrators.

FIG. 7B is a diagram illustrating a method for determining a constant of a capacitor from a speed difference.

FIG. 8 illustrates a measurement result of a frequency and a speed of a vibration type driving apparatus.

FIG. 9A illustrates a vibration type driving apparatus.

FIG. 9B illustrates a vibration type driving apparatus.

FIG. 10 illustrates a specific configuration example 1 of a circuit including a driving circuit, a plurality of vibrators, and an electric element.

FIG. 11 illustrates a method for calculating voltages V1, V2, and V3 respectively applied to three vibrators.

FIG. 12A is a diagram illustrating a relationship between frequencies f and speeds s of three vibrators.

FIG. 12B is a diagram illustrate a method for determining constants of capacitors from speed differences.

FIG. 13 illustrates a measurement result of a frequency and a speed of a vibration type driving apparatus.

FIG. 14A illustrates a configuration of a comparative example.

FIG. 14B illustrates a measurement result of a rotational speed and a circuit power consumption in the comparative example.

FIG. 15A illustrates a modified example of a second exemplary embodiment.

FIG. 15B illustrates a modified example of the second exemplary embodiment.

FIG. 16A illustrates a configuration of a configuration example 2.

FIG. 16B illustrates a configuration of a configuration example 2.

FIG. 17A illustrates a comparison result of the configuration example 1 and the configuration example 2 for a change in speed difference based on variations in impedances of vibrators.

FIG. 17B illustrates a comparison result of the configuration example 1 and the configuration example 2 for a change in speed difference based on variations in impedances of vibrators.

FIG. 18 illustrates a driving mechanism unit of a lens in a lens barrel.

DESCRIPTION OF EMBODIMENTS

Various exemplary embodiments, features, and aspects of the disclosure will be described in detail below with reference to the drawings. However, the invention is not limited to this. The present invention includes variations of its configuration, material, and method without departing from the idea of the invention.

Conventionally, a method for driving a plurality of vibrators by one driving circuit has been proposed. However, in the vibration type motor, the vibrators and a driven member are independently configured. Thus, even if the vibrators differ in speed, driving efficiency of the vibration type motor does not deteriorate. On the other hand, in a case where the plurality of vibrators is brought into pressure contact with a common driven member to configure one vibration type motor, there arises a new issue that the driving efficiency of the vibration type motor deteriorates due to speed differences among the vibrators. The vibrators are pulled by one another via the common driven member due to the speed differences among the vibrators. Thus, a slip of a frictional sliding portion with the driven member increases and a sliding loss accordingly increases, thereby causing the above issue. The speed of the driven member becomes lower than an average value of speeds of the plurality of vibrators.

First Exemplary Embodiment

Vibration type driving apparatuses according to exemplary embodiments of the present invention will be described with reference to the drawings.

FIGS. 2A, 2B, 2C, and 2D illustrate a drive principle of a vibration type linear drive motor. The vibration type motor illustrated in FIG. 2A includes a vibrator 205 in which a piezoelectric element 204 is adhered to an electric member 203, and a driven member 201 that is driven by the vibrator 205. An alternating voltage is applied to the piezo-electric element 204, whereby vibrations in two vibration modes as illustrated in FIGS. 2C and 2D are generated in the vibrator 205, and the driven member 201 which is in pressure contact with protrusions 202 is moved in directions indicted by an arrow. FIG. 2B illustrates an electrode pattern of the piezoelectric element 204. In the piezoelectric element 204 of the vibrator 205, for example, an electrode region, which is divided into two equal electrode regions in a longitudinal direction, is formed. Polarization directions in the two electrode regions are the same direction (+). Out of the two electrode regions in the piezoelectric element 204, an alternating voltage (VB) is applied to the electrode region positioned on the right side of FIG. 2B, and an alternating voltage (VA) is applied to the electrode region positioned on the left side thereof. In a case where the alternating voltages VB and VA respectively have frequencies close to a resonance frequency in a first vibration mode and have the same phase, the entire piezoelectric element 204 (the two electrode regions) extends at a certain instant and contracts at another instant. As a result, vibration in the first vibration mode illustrated in FIG. 2C is generated in the vibrator 205. Alternatively, in a case where the alternating voltages VB and VA respectively have frequencies close to a resonance frequency in a second vibration mode and have phases that are shifted by 180 degrees from each other, the electrode region on the right side of the piezoelectric element 204 and the electrode region on the left side thereof respectively contracts and extends at a certain instant, and respectively extends and contracts at another instant. As a result, vibration in the second vibration mode illustrated in FIG. 2D is generated in the vibrator 205. Thus, the driven member 201 is driven in the directions indicated by the arrow in FIG. 2A by combining the two vibration modes. A generation ratio of the first vibration mode and the second vibration mode can be changed by changing a phase difference between the alternating voltages input to the two electrodes. In this vibration type motor, the speed of the driven member 201 can be changed by changing the generation ratio of the two vibration modes.

FIG. 1 illustrates a concept of a vibration type driving apparatus according to an exemplary embodiment of the present invention. A vibration type motor 105 includes a plurality of vibrators (a first vibrator 101, a second vibrator 102, and a third vibrator 103), and a driven member 104 brought into pressure contact with the plurality of vibrators. The driven member 104 receives driving forces from the respective vibrators, and relatively moves at a predetermined speed based on a driving force obtained by combining the received driving forces. In a first exemplary embodiment, an example in which the number of vibrators is three will be described. However, the number of vibrators may be two, or may be three or more.

A driving circuit 106 outputs an alternating voltage based on a driving signal having a predetermined frequency, and drives the plurality of vibrators connected in parallel. A first electric element 107 is connected in series between the first vibrator 101 and the second vibrator 102, and a second electric element 108 is connected between the second vibrator 102 and the third vibrator 103. In other words, the second vibrator 102 is connected to the driving circuit 106 via the first electric element 107, and the third vibrator 103 is connected to the driving circuit 106 via the first electric element 107 and the second electric element 108.

More specifically, when a case where the number of vibrators is two, e.g., the vibrators 101 and 102, is used as an example, the vibration type driving apparatus may have the following configuration. The first vibrator 101 includes an electro-mechanical energy conversion element, and is configured to be in pressure contact with the driven member 104. The vibrator 102 includes an electro-mechanical energy conversion element, and is configured to be in pressure contact with the driven member 104. The vibration type driving apparatus includes the first vibrator 101, the second vibrator 102, and the first electric element 107 connected in series between the first vibrator 101 and the second vibrator 102. A first terminal 101*a* of the first vibrator 101 is connected to the driving circuit 106 and a first terminal 107*a* of the first electric element 107. A second terminal 107*b* of the first electric element 107 is connected to a first terminal 102*a* of the second vibrator 102. A second terminal 101*b* of the first vibrator 101 and a second terminal 102*b* of the second vibrator 102 are electrically connected to the driving circuit 106. A first terminal 108*a* of the second electric element 108 is connected to the second terminal 107*b* of the first electric element 107 and the first terminal 102*a* of the second vibrator 102. Further, when a third vibrator 103 is provided in addition to the first vibrator 101 and the second vibrator 102, a second terminal 108*b* of the second electric element 108 is connected to a first terminal of the third vibrator 103. A second terminal of the third vibrator 103 is electrically connected to the driving circuit 106.

As the electric element, a capacitor, for example, is used. In the present exemplary embodiment, the vibration type driving apparatus in which the electric elements are provided between the respective vibrators, and an arrangement of the vibrators will be described. Resonance frequencies f of the first, the second, and the third vibrators will be respectively described as resonance frequencies f1, f2, and f3, and voltages V applied thereto will be respectively described as voltages V1, V2 and V3. In the present exemplary embodiment, the first, the second, and the third vibrators 101, 102, and 103 are arranged so that the respective resonance frequencies f1, f2, and f3 satisfy a relationship of f1<f2<f3. This is because, the lower the resonance frequency of the vibrator is, the lower the speed thereof becomes when the first, the second, and the third vibrators are driven with a same driving frequency. Details thereof will be described below. In other words, a speed difference arises from a difference in resonance frequency. To correct the speed difference, a voltage ratio is adjusted. According to impedances of the electric elements 107 and 108, the voltages V1, V2, and V3 satisfy a relationship of |V1|>|V2|>|V3| where their respective absolute values are |V1|, |V2|, and |V3|. Therefore, the lower the speed (resonance frequency) of the vibrator is, the higher the voltage to be applied to the vibrator becomes. Thus, a speed difference is reduced among the vibrators, and a slip of a friction sliding portion between each of the vibrators 101, 102, and 103 and the driven member 104 decreases, so that driving efficiency can be enhanced. While the driven members 104 is integrally formed for convenience of illustration, driven members may be respectively provided for the vibrators and connected to a fixing member (not illustrated), to function as an integrated object.

Next, a vibration type motor including two vibrators will be described below as an example.

FIG. 3 is a perspective view of a vibration type motor including two vibrators and a driven member, used in the present exemplary embodiment. The vibration type motor has a configuration in which two vibrators (first and second vibrators 302 and 303) are arranged symmetrically with respect to an X-Y plane to sandwich a square bar-shaped driven member 301 therebetween in a Z-axis direction indicated in FIG. 3. Elliptical vibration is generated in driving portions of the first and the second vibrators 302 and 303 brought into pressure contact with upper and lower frictional surfaces of the driven member 301. By the generated driving force, the driven member 301 and the first and the second vibrators 302 and 303 relatively move in an X direction. A configuration and a drive principle of the two vibrators 302 and 303 are similar to those of the above-mentioned vibrator 205 illustrated in FIGS. 2A to 2D.

Referring to FIG. 3, the first vibrator 302 is arranged on the −Z side of the driven member 301. An orientation of the first vibrator 302 is determined so that the above-mentioned protrusions 202 illustrated in FIG. 2A contact the driven member 301. The first vibrator 302 is fixed to a vibrator fixing member 304. The second vibrator 303 is arranged on the +Z side in FIG. 3 of the driven member 301. An orientation of the second vibrator 303 is also determined so that the above-mentioned protrusions 202 contact the driven member 301. The second vibrator 303 is fixed to a vibrator fixing member 305. A transmission member 306 retains the vibrator fixing members 304 and 305 while transmitting an output generated by the vibration type motor to the outside. Further, the vibration type driving apparatus includes two elastic elements 307 respectively retained by the vibrator fixing members 304 and 305. In the present exemplary embodiment, a coil spring is used as the elastic element 307. However, an elastic member in another form such as a leaf spring may be used as the elastic element 307. Each of the first vibrator 302 and the second vibrator 303 is provided with a flexible circuit board (not illustrated), which electrically connects a piezoelectric element to the outside. The two vibrators 302 and 303 are connected in parallel with a driving circuit (not illustrated), and an alternating voltage is applied thereto using a shared driving circuit.

FIG. 4 illustrates a position control system in the vibration type driving apparatus according to the present exemplary embodiment. A position instruction from a controller (not illustrated) is input to a control circuit 401. In the control circuit 401, a deviation is calculated from a difference between the position instruction and a detection position obtained by a position detection circuit 409. In the control circuit 401, calculation by a proportional-integral-derivative (PID) compensator in the control circuit 401 is performed based on the deviation information, and a control signal including driving parameters is output. The PM compensator is the sum of outputs of compensators respectively having functions of proportion (P), integration (I), and derivation (D), and is generally used for compensating for phase delay and gain of a control target so as to construct a stable and highly-precise control system.

A control signal having frequency, phase difference, and pulse width information, which serve as driving parameters of the vibration type driving apparatus, is output from the control circuit 401, and is input to a pulse generator 402. The pulse generator 402 generates a pulse signal, which changes in driving frequency according to an input control signal. A digital frequency divider circuit, a voltage controlled oscillator (VCO), or the like is used as the pulse generator 402. The pulse generator 402 may generate a pulse signal, which changes in pulse width according to the control signal by pulse width modulation (PWM) control. The pulse signal output from the pulse generator 402 is input to a switching circuit 404. Two alternating voltages whose phases differ from each other by 90 degrees are output from the switching circuit 404. The switching circuit 404 performs a switching operation of a direct current (DC) voltage supplied from a DC power source 403 at a timing of an input pulse signal, to generate a rectangular wave alternating voltage. The alternating voltage is input to a driving circuit 405. The driving circuit 405 boosts the input alternating voltage to a desired driving voltage.

An alternating voltage having a waveform of a sine (SIN) wave that is output from the driving circuit 405 is applied to respective piezoelectric elements of the first vibrator 302 and the second vibrator 303 via a power feeding member 406 such as a flexible printed circuit (FPC) board, to drive the driven member 301. A capacitor 410 serving as an electric element is mounted between the first vibrator 302 and the second vibrator 303 on the power feeding member 406. A position sensor 408 detects a relative position of a position scale 407 attached to the driven member 301, and the position detection circuit 409 detects position information. The position information is input to the control circuit 401, and a vibration type motor 308 is feedback-controlled to approach a position instruction.

The present exemplary embodiment will be described using as an example a two-phase driving circuit, in which a piezoelectric element serving as an electro-mechanical energy conversion element has first and second regions and the first and the second regions are separately driven. In a case of two-phase driving, there is no difference between the first and the second regions except that phases of alternating voltages respectively applied to the first and the second regions are shifted by +−90 degrees from each other. Thus, a circuit configuration of only the first region will be described below. However, an exemplary embodiment of the present invention is not limited to two-phase driving, and is widely applicable to a traveling wave type motor having four or more phases, for example. An oscillator and a switching circuit that are for generating an alternating signal are not particularly limited as long as an effect of the present invention can be obtained. Therefore, a circuit configuration of a driving circuit that outputs an alternating voltage Vo, a vibrator, and a capacitor will be described below.

FIG. 5 illustrates a specific configuration example of a circuit including a driving circuit, a plurality of vibrators, and an electric element, according to the present exemplary embodiment. A driving circuit 501 includes a coil for harmonic removal 502 and a boosting transformer 503.

The coil 502 has an inductance value of 15 microhenries, and the transformer 503 has an inductance value on the secondary side of 1.69 mH at a turn ratio of 10. The driving circuit 501 boosts an alternating voltage Vi of a rectangular wave of 12 Vpp by a factor of approximately 10, to output an alternating voltage Vo of an SIN wave of 120 Vpp.

The driving circuit in the present exemplary embodiment is one configuration example, and only a coil or only a transformer, for example, may constitute a boosting unit. An alternating voltage Vo is applied to a first vibrator 504 and a second vibrator 505 connected in parallel. A capacitor 506 is connected in series between the first vibrator 504 and the second vibrator 505, and can adjust a ratio of voltages respectively applied to the two vibrators 504 and 505. The capacitor 506 has a capacitance value of 2.7 nF. A method for determining this constant will be described below.

While the present exemplary embodiment uses the capacitor 506, an exemplary embodiment of the present invention is not limited to this. The capacitor 506 may be an element having an impedance, such as a coil or a resistor. The coil or the resistor having an impedance enough to change a voltage ratio, however, becomes high in constant, due to a relationship with an impedance of the vibrator. Therefore, in a case where the coil or the resistor is used as an electric element, a resistance value becomes larger than that of the capacitor 506. Thus, a heat loss during driving can be more suppressed and power consumption can be more reduced by using the capacitor 506 as the electric element.

FIGS. 6A and 6B illustrate methods for calculating voltages V1 and V2 applied to two vibrators. FIG. 6A illustrates an equivalent circuit which includes an alternating voltage Vo of an output unit of the circuit illustrated in FIG. 5, and the vibrators and the capacitor thereof expressed in terms of impedances. When the impedance of the capacitor 506 is Zc1 (601), and the impedances of the first vibrator 504 and the second vibrator 505 are respectively Zm1 (602) and Zm2 (603), the voltages V1 and V2 are calculated by the following equations.

[Math. 1]

$$V1 = Vo \quad \text{(Equation 1-1)}$$

[Math. 2]

$$V2 = V1 \cdot \frac{Zm2}{Zc1 + Zm2} \quad \text{(Equation 1-2)}$$

FIG. 6B illustrates the equivalent circuit in the impedances Zm1 (602) and Zm2 (603) of the vibrators 504 and 505. Each of the impedances Zm1 and Zm2 includes a parallel circuit of a capacitor 604 representing a capacitance Cd of a piezoelectric element, and an RIX series circuit of a mechanical vibration portion. The RLC series circuit includes an equivalent coil 605 having a self-inductance Lm, an equivalent capacitor 606 having a capacitance Cm, and an equivalent resistor 607 having a resistance value Rm.

Constants Lm, Co, Rm, and Cd of the vibration type driving apparatus used in the present exemplary embodiment are 50 mH, 65 pF, 3000 ohms, and 0.54 nF, respectively. In a case where a driving frequency is far from a resonance frequency, the mechanical vibration portion is ignored because the impedance is very large. The impedances Zm1 and Zm2 are calculated from an impedance of the piezoelectric element having the capacitance Cd. Accordingly, when a driving frequency is 90 kHz, the impedance Zm1 (602) is calculated to be 3275 ohms. On the other hand, the capacitance value of the capacitor 506 is 2.7 nF. Thus, the impedance Zc1 (601) of the capacitor 506 is 655 ohms. Therefore, V2=V1*0.83 from Equation 1-2. In other words, a ratio of the voltages V1 and V2 respectively applied to the two vibrators 504 and 505 can be adjusted by adjusting the capacitance value of the capacitor 506.

Next, a specific method for determining a constant of the capacitor 506 will be described below. FIG. 7A is a diagram illustrating a relationship between frequencies f and speeds s of the two vibrators 504 and 505, and FIG. 7B is a diagram illustrating a method for determining the constant of the capacitor 506 from a speed difference. FIG. 7A illustrates an f-s characteristic representing a relationship between a frequency f and a speed s of the vibration type motor according to the present exemplary embodiment.

A resonance frequency f1 of the first vibrator 504 and a resonance frequency f2 of the second vibrator 505 are assumed to differ from each other due to individual variation. A difference between the resonance frequencies f1 and f2 causes a speed difference, to reduce driving efficiency. In other words, the f-s characteristic is totally shifted by an amount corresponding to the frequency difference. Thus, a difference arises between respective speeds s1 and s2 of the first vibrator 504 and the second vibrator 505 at the same driving frequency.

FIG. 7B illustrates a method for determining the constant of the capacitor 506 for each step. In step 1, the resonance frequencies f1 and f2 of the first and second vibrators 504 and 505 are measured. This is so-called impedance measurement for measuring a frequency response while applying an alternating-current (AC) input signal between electrodes of the vibrators 504 and 505, which is a conventionally known general-purpose method. In step S2, a difference between the resonance frequencies f1 and f2 is calculated. In step 3, the speeds s1 and s2 are estimated based on the frequency difference. This is to calculate from the frequency difference its shift amount and estimate the speeds s1 and s2, based on the f-s characteristic. As the f-s characteristic, measurement data of a real machine, or an approximate equation may be used.

In step S4, a speed ratio s1/s2 is calculated. In step S5, a voltage ratio V2/V1 is calculated based on the speed ratio s1/s2. A speed of the vibration type motor is substantially proportional to its voltage. Thus, the voltage ratio V2/V1 is determined based on the speed ratio s1/s2, as expressed in the following equation.

$$V2/V1 = k \cdot s1/s2 \qquad \text{[Math.3]}$$

(Equation 1-3)

While a proportional k of the vibration type motor according to the present exemplary embodiment is one, the proportional k may be changed according to a motor characteristic. Finally, in step S6, the constant of the capacitor 506 is determined using an arithmetic equation. Equation 1-2 is used as the arithmetic equation. The impedance Zc1 of the capacitor 506 is calculated using the voltage ratio V2/V1 to be set and the impedances Zm1 and Zm2 of the vibrators 504 and 505. The capacitance value of the capacitor 506 may be determined according to the impedance Zc1.

An example in which the above-mentioned method is applied to the vibration type driving apparatus will be described. FIG. 8 illustrates a measurement result of a frequency and a speed of the vibration type motor according to the present exemplary embodiment. FIG. 8 illustrates measured values of an f-s characteristic of a motor obtained by selecting and combining two vibrators having resonance frequencies that match each other. A resonance frequency f2 of the second vibrator is larger by 0.5 kHz than a resonance frequency f1 of the first vibrator due to individual variation. A speed s2 of the second vibrator at a driving frequency of 90 kHz is 235 mm/s. Since a speed of a vibrator decreases according to a resonance frequency differences, a speed s1 of the first vibrator is to be 195 minis according to a resonance frequency difference 0.5 kHz. The speeds s1 and s2 are thus estimated based on the f-s characteristic.

The two vibrators may be individually driven to directly measure the speeds. However, a time is required for measurement due to, for example, assembling/disassembling of the motor. A speed ratio s1/s2 is calculated to be 195/235=0.83. Therefore, a voltage ratio V2/V1 is determined to be 0.83. Accordingly, a capacitance value of the capacitor can be determined to be 2.7 nF from Equation 1-2.

Thus, in a vibration type driving apparatus including a vibration-type motor including a plurality of vibrators, which differ in resonance frequency, a voltage ratio can be set so as to compensate for a speed difference. As a result, a decrease in driving efficiency of the motor can be suppressed.

Second Exemplary Embodiment

An example of a vibration type driving apparatus including a vibration type motor including three vibrators and a driven member will be described below. A second exemplary embodiment differs from the first exemplary embodiment in that the number of vibrators is three, a different equation is used for calculating a voltage V, and the number of arrangement variations of capacitors increases.

FIGS. 9A and 9B illustrate the vibration type driving apparatus according to the present exemplary embodiment. In the present exemplary embodiment, three vibrators are connected in parallel with a driving circuit. FIG. 9A illustrates a configuration of a vibration type motor using three vibrators and a driving circuit. A base plate 901 serves as a base of the vibration type motor. First, second, and third vibrators 903, 904, and 905 are brought into pressure contact with a driven member 902, and the driven member 902 is driven to rotate. Each of the vibrators 903, 904, and 905 is similar to the vibrators described in the first exemplary embodiment. A power feeding member 909 is connected in parallel with the three vibrators 903, 904, and 905, and two driving signals are supplied to each of the three vibrators 903, 904, and 905. A common driving circuit 910 drives the three vibrators 903, 904, and 905.

When an alternating voltage is applied to the vibrators 903, 904, and 905, a vibration wave for generating a driving force in the same rotational direction occurs in each of the vibrators 903, 904, and 905, and the driven member 902 is driven to rotate around a rotation shaft 907. When the three vibrators are used, as in the present exemplary embodiment, a combined rotation driving force is exerted on the driven member 902. Thus, a torque can be raised by three times a torque obtained when the number of vibrators is one. A position sensor 906 detects a rotational position of the driven member 902.

FIG. 9B is a side view of the vibration type driving apparatus. Each of the vibrators 903, 904, and 905 is obtained by integrating a vibrating member having a two-point protrusion and a piezoelectric element (not illustrated) by adhesion, and is attached to the base plate 901 via an attachment member. A disk-shaped scale portion 908 is provided on an upper surface of the position sensor 906. When the scale portion 908 moves in the rotational direction, a position signal corresponding to the movement amount is output from the position sensor 906. A capacitor 911 is mounted between the first vibrator 903 and the second vibrator 904 in the power feeding member 909, and a capacitor 912 is mounted between the second vibrator 904 and the third vibrator 905.

FIG. 10 illustrates a specific configuration example 1 of a circuit including a driving circuit, a plurality of vibrators, and an electric element, according to the present exemplary embodiment of the present invention, and illustrates a driving circuit 1001 corresponding to one phase. The driving circuit 1001 includes a coil for harmonic removal 1002 and a boosting transformer 1003, and has circuit constants similar to that in the first exemplary embodiment. An alternating voltage Vo is applied to a first vibrator 1004, a second vibrator 1005, and a third vibrator 1006 that are connected in series. A first capacitor 1007 is connected in series between the first vibrator 1004 and the second vibrator 1005, and a second capacitor 1008 is connected between the second vibrator 1005 and the third vibrator 1006. With this configuration, a ratio of voltages respectively applied to the first, the second, and the third vibrators 1004, 1005, and 1006 can be adjusted.

FIG. 11 illustrates a method for calculating voltages V1, V2 and V3 respectively applied to the three vibrators 1004, 1005, and 1006. FIG. 11 illustrates an equivalent circuit which includes an alternating voltage Vo of an output unit of the circuit illustrated in FIG. 10, and the vibrators and the capacitors thereof expressed in terms of impedances. The impedances of the first capacitor 1007 and the second capacitor 1008 are respectively Zc1 (1101) and Zc2 (1102). The impedances of the first vibrator 1004, the second vibrator 1005, and the third vibrator 1006 are Zm1 (1103), Zm2 (1104), and Zm3 (1105), respectively. In this case, the voltages V1, V2 and V3 are calculated by the following equations.

[Math. 4]

$$V1 = Vo \quad \text{(Equation 2-1)}$$

[Math. 5]

$$V2 = V1 \cdot \frac{1/Zc1}{1/Zc1 + 1/Zm2 + 1/(Zc2 + Zm3)} \quad \text{(Equation 2-2)}$$

[Math. 6]

$$V3 = V2 \cdot \frac{Zm3}{Zc2 + Zm3} \quad \text{(Equation 2-3)}$$

The impedances Zm1 (1103), Zm2 (1104), and Zm3 (1105) of the vibrators 1004, 1005, and 1006 are calculated using a capacitance Cd of a piezoelectric element, as in the first exemplary embodiment. For example, in a case where the capacitance Cd is 0.54 nF and a driving frequency is 90 kHz, the impedances Zm1, Zm2, and Zm3 are calculated to be 3275 ohms. Capacitance values of the first and second capacitors 1007 and 1008 are determined using the above equations of the voltages V. In this case, as an order of calculations, the capacitance value of the second capacitor 1008 is initially determined based on a voltage ratio V3/V2, and the capacitance value of the first capacitor 1007 is then determined based on a voltage ratio V2/V1. This is because the voltage ratio V2/V1 cannot be calculated unless the capacitance value of the second capacitor 1008 is determined. In other words, if the number of vibrators is increased to four, five, and so on, capacitance values of capacitors are determined in order from the capacitor connected between the vibrators having the largest numbers.

Next, a specific method for determining constants of the capacitors 1007 and 1008 will be described below. FIG. 12A is a diagram illustrating a relationship between frequencies f and speeds s of the three vibrators 1004, 1005, and 1006, and FIG. 12B is a diagram illustrating a method for determining constants of the capacitors from speed differences. FIG. 12A illustrates an f-s characteristic representing a relationship between a frequency f and a speed s of the vibration type motor according to the present exemplary embodiment. Respective resonance frequencies f1, f2, and f3 of the first, the second, and the third vibrators 1004, 1005, and 1006 are assumed to differ from one another due to individual variation.

Respective differences between the resonance frequencies f1 and f2 and between the resonance frequencies f2 and f3 cause speed differences, to reduce driving efficiency. In other words, the f-s characteristic is totally shifted by amounts corresponding to the frequency differences. Thus, differences arise among respective speeds s1, s2, and s3 of the first vibrator 1004, the second vibrator 1005, and the third vibrator 1006 at the same driving frequency.

FIG. 12B illustrates a method for determining the constants of the capacitors 1007 and 1008 for each step. In step 1, the resonance frequencies f1, f2, and f3 of the first, the second, and the third vibrators 1004, 1005, and 1006 are measured. In step 2, differences between the resonance frequencies f1 and f2 and between the resonance frequencies f2 and f3 are calculated. In step 3, the speeds s1, s2, and s3 are estimated based on the frequency differences. This is to calculate from the frequency differences their shift amounts and estimate the speeds s1, s2, and s3, based on the f-s characteristic. In step S4, speed ratios s1/s2 and s2/s3 are calculated. In step 5, a voltage ratio V3/V2 is calculated based on the speed ratio s1/s2. A speed of the vibration type motor is substantially proportional to its voltage. Thus, the voltage ratio V3/V2 is determined based on the speed ratio s2/s3, as expressed in Equation 2-5.

[Math.7]

$$V2/V1 = k \cdot s1/s2 \quad \text{(Equation 2-4)}$$

[Math.8]

$$V3/V2 = k \cdot s2/s3 \quad \text{(Equation 2-5)}$$

While a proportional k of the vibration type motor is one in the present exemplary embodiment, the proportional k may be changed according to a motor characteristic. In step 6, the constant of the second capacitor 1008 is then determined using an arithmetic equation. Equation 2-3 is used as the arithmetic equation. The impedance Ze2 of the second capacitor 1008 is calculated using the voltage ratio V3/V2 to be set and the impedance Zm3 of the third vibrator 1006. The capacitance value of the second capacitor 1008 is then determined according to the impedance Zc2.

In step S7, a voltage ratio V2/V1 is calculated based on the speed ratio s1/s2. Similarly, the voltage ratio V2/V1 is determined based on the speed ratio s1/s2, as expressed in Equation 2-4. Finally, in step 8, the constant of the first capacitor 1007 is determined using an arithmetic equation. Equation 2-2 is used as the arithmetic equation. The impedance Zc1 of the first capacitor 1007 is calculated using the voltage ratio V2/V1 to be set, the impedances Zm2 and Zm3 of the second and the third vibrators 1005 and 1006, and the impedance Zc2 of the second capacitor 1008. The capacitance value of the first capacitor 1007 is determined according to the impedance Zc1.

An example of the vibration type driving apparatus configured by applying the above-mentioned method to its design will be described, as in the first exemplary embodiment. FIG. 13 illustrates a measurement result of a frequency and a speed of the vibration type motor according to the present exemplary embodiment. FIG. 13 illustrates measured values of an f-s characteristic of a motor obtained by selecting and combining three vibrators having resonance frequencies that match one another. A resonance frequency f2 of the second vibrator is larger by 0.5 kHz than a resonance frequency f1 of the first vibrator, and a resonance frequency f3 of the third vibrator is larger by 0.6 kHz than the resonance frequency f2 of the second vibrator due to individual variation.

A speed s2 of the second vibrator at a driving frequency 90 kHz is 53 rpm. A speed s1 of the first vibrator decreases according to a resonance frequency difference 0.5 kHz, to be 47 rpm. A speed s3 the third vibrator 1006 increases according to a resonance frequency difference 0.6 kHz b, to be 64 rpm. Thus, the speeds s1, s2, and s3 are estimated based on the f-s characteristic. Accordingly, a speed ratio s1/s2 is calculated to be 0.89, and a speed ratio s2/s3 is calculated to be 0.83. Therefore, a voltage ratio V2/V1 is determined to be 0.89, and a voltage ratio V3/V2 is determined to be 0.83. Then, a capacitance value of the second capacitor 1008 is calculated using Equation 2-3, and is determined to be 2.7 nF. A capacitance value of the first capacitor 1007 is calculated using Equation 2-2, and is determined to be 8.0 nF.

When the configuration according to the present exemplary embodiment is thus applied to a vibration type driving apparatus including a vibration type motor including three vibrators, which differ in resonance frequency, voltage ratios can be set so as to compensate for speed differences. Therefore, a decrease in driving efficiency of the motor can be prevented.

FIG. 14A illustrates a configuration of a comparative example used to exhibit an effect of the present invention, and FIG. 14B illustrates a measurement result of a rotational speed and a circuit power consumption in the comparative example. FIG. 14A illustrates the configuration in the comparative example. As illustrated in FIG. 14A, three vibrators 1004, 1005, and 1006 are connected in parallel with a driving circuit 1001, and first and second capacitors are not connected between the vibrators 1004 and 1005, and between the vibrators 1005 and 1006. FIG. 14B illustrates a measurement result of a rotational speed and a circuit power consumption in the vibration type driving apparatus according to the present exemplary embodiment. A horizontal axis and a vertical axis respectively indicate a rotational speed and a circuit power consumption. Differences in resonance frequency among the three vibrators 1004, 1005, and 1006 are similar to those described in FIG. 13.

First, circuit power consumptions in the present exemplary embodiment and the comparative example at a rotational speed of 53 rpm are compared with each other. The circuit power consumption is 1.6 W in the comparative example while being 1.3 W when the configuration according to the present exemplary embodiment is applied to the vibration-type driving apparatus. In the comparative example, a slip is great due to speed differences, so that a sliding loss is great. On the other hand, in the vibration type driving apparatus according to the present exemplary embodiment, speed differences are reduced and driving efficiency is improved. As a result, power can be reduced by 19%. Furthermore, when attention is paid to a maximum speed, the maximum speed is 63 rpm in the comparative example, while being 81 rpm in the vibration type driving apparatus according to the present exemplary embodiment. The maximum speed can be therefore improved by a factor of 1.3. Thus, it is possible to not only improve the driving efficiency but also exhibit the original performance of the vibration type motor.

FIGS. 15A and 15B respectively illustrate modified examples of the vibration type driving apparatus described in the second exemplary embodiment of the present invention. The two modified example will be described. FIG. 15A illustrates a case where the vibration type driving apparatus includes only a first capacitor 1007. The modified example is applicable to a case where resonance frequencies f1, f2, and f3 of first, second, and third vibrators 1004, 1005, and 1006 satisfy the following relationship:

$$f1 < f2 \approx f3.$$

In other words, when the respective resonance frequencies f2 and f3 of the second vibrator 1005 and the third vibrator 1006 match each other or are close to each other, a speed difference therebetween decreases. A vibration type driving apparatus in which an effect of speed differences in driving among the vibrators 1004, 1005, and 1006 is suppressed can be therefore implemented by setting voltages V to satisfy the following relationship:

$$|V1| > |V2| \approx |V3|.$$

Resonance frequencies of a plurality of vibrators matching one another or being close to one another refers to a case where speed differences among the plurality of vibrators in a vibration type driving apparatus do not substantially affect driving of the vibration type driving apparatus, e.g., a case where differences among resonance frequencies of the plurality of vibrators are 0.5 kHz or less.

FIG. 15B illustrates a case where a vibration type driving apparatus includes only a second capacitor 1008. Similarly, the modified example is applicable to a case where resonance frequencies f1, f2, and f3 of first, second, and third vibrators 1004, 1005, and 1006 satisfy the following relationship:

$$f1 \approx f2 < f3.$$

Accordingly, voltages V are set to satisfy the following relationship:

$$|V1| \approx |V2| > |V3|.$$

By combining a basic configuration (three vibrators) illustrated in FIG. 10 in the second exemplary embodiment and the configurations in the modified examples illustrated in FIGS. 15A and 15B, in addition to the configuration (the two vibrators) in the first exemplary embodiment, the present invention is also applicable to a vibration type motor including four or more vibrators.

If three or more vibrators are provided, a configuration example 2 illustrated in FIGS. 16A and 16B can also be used as a circuit including a driving circuit, a plurality of vibrators, and an electric element. In FIGS. 16A and 16B, impedances Zm1 (1603), Zm2 (1604), and Zm3 (1605) of three vibrators are connected in parallel with an alternating voltage Vo.

Therefore, if n (n is an integer of three or more) vibrators are provided, the configuration example 1 illustrated in FIG. 10 and the configuration example 2 illustrated in FIGS. 16A and 16B can be used. In the configuration example 1, an (n−1)-th electric element and an n-th vibrator are connected in series, and are connected in parallel with an (n−1)-th vibrator. The (n−1)-th electric element and the n-th vibrator are connected to a driving circuit via first, second, . . . , (n−2)-th electric elements. In the configuration example 2, an (n−1)-th electric element and an n-th vibrator are connected in series, and are connected in parallel with an (n−2)-th electric element and an (n−1)-th vibrator. Therefore, in the configuration example 2, the (n−1)-th electric element and the n-th vibrator are connected to a driving circuit not via another electric element.

In either one of the circuits, a speed difference due to variations among a plurality of vibrators can be reduced. However, in the configuration example 1 illustrated in FIG. 10, the above-mentioned effect is greater, and the decrease in driving efficiency can be more suppressed.

For example, speed differences arising when the impedance of the third vibrator 1006 changes in the configuration example 1 and the configuration example 2 are compared with each other. In FIG. 16A illustrating the configuration example 2, an impedance Zc1 (1601) of the first capacitor is connected in series with an impedance Zm2 (1604) of the second vibrator 1005, and an impedance Zc2 (1602) of the second capacitor is connected in series with an impedance Zm3 (1605) of the third vibrator 1006. FIG. 16B illustrates a specific circuit configuration in the configuration example 2. A first capacitor 1601 and a second capacitor 1602 are respectively determined to have capacitance values of 4.4 and 1.6 nF. These constants are set to be the same values as the voltage ratios V2/V1 and V3/V2 calculated in FIG. 13 in the second exemplary embodiment of the present invention.

FIGS. 17A and 17B respectively illustrate comparison results of the configuration example 1 and the configuration example 2 for a change in speed difference based on variations in impedances of vibrators on the premise that the impedances of the first and second vibrators do not change and the impedance of the third vibrator changes. Since a resonance frequency of the third vibrator is the highest, when a driving frequency is swept during speed control, a current first flows so that the impedance thereof varies. In this calculation, an impedance ratio Zm3/Zm2 is changed from a standard value of 1.0 to 0.2. The impedance Zm2 is the same value as the impedance Zm1.

FIG. 17A illustrates a calculation result of voltage ratios V2/V1 and V3/V2 based on the impedance ratio Zm3/Zm2. A broken line and a solid line respectively indicate the configuration example 2 and the configuration example 1. In a case where the impedance ratio Zm3/Zm2 is 1.0, there is no difference therebetween. In a case where the impedance ratio Zm3/Zm2 decreases to 0.2, it is found that a difference between the voltage ratios is small in the vibration type driving apparatus in the configuration example 1. FIG. 17B illustrates a calculation result of a speed ratio s2/s3 to which the above-mentioned voltage ratio is converted. The speed ratio s2/s3 represents a speed difference between the second vibrator and the third vibrator. It is found that the speed difference in the vibration type driving apparatus in the configuration example 1 is smaller than the speed difference in the vibration type driving apparatus in the configuration example 2. Accordingly, it is found that, when the vibration type driving apparatus has the configuration illustrated in the configuration example 1, even if the impedance of the third vibrator varies, an effect of reducing the speed difference is likely to be obtained.

Third Exemplary Embodiment

In a third exemplary embodiment, an example in which a vibration type driving apparatus according to the present invention is applied to an imaging apparatus (optical apparatus) such as a camera wilt be described. In the present exemplary embodiment, an example in which a vibration type driving apparatus for driving a lens to perform automatic focusing is incorporated into a lens barrel of an imaging apparatus will be described with reference to FIG. 18.

FIG. 18 illustrates a driving mechanism unit of a lens in the lens barrel. The driving mechanism of the imaging apparatus according to the present exemplary embodiment includes a vibrator, a lens holder, and a first guide bar and a second guide bar which are arranged parallel to each other for slidably retaining the lens holder. By an elliptic motion of a protruding portion of the vibrator that is generated by applying a driving voltage to an electro-mechanical energy conversion element, a relative movement force is generated between the vibrator and the second guide bar contacting a protruding portion of an elastic member of the vibrator. Thus, the lens holder is movable along the first and second guide bars.

More specifically, as illustrated in FIG. 18, a driving mechanism 50 of the imaging apparatus according to the present exemplary embodiment mainly includes a lens holder 52 serving as a lens holding member, a lens 57, vibrators 51a and 51b to which a flexible printed circuit board is coupled, two guide bars 53 and 54, and a board (not illustrated). A vibration type motor including the two vibrators 51a and 51b as described with reference to FIG. 3, and including the second guide bar 54 as a driven member will be described as an example.

Both ends of each of the first guide bar 53 and the second guide bar 54 are retained and fixed by the board (not illustrated) so that the guide bars 53 and 54 are arranged parallel to each other.

The lens holder 52 includes a cylindrical holder portion 52a, a retaining portion 52b for retaining and fixing the vibrators 51a and 51b, and a first guide portion. 52c fitted with the first guide bar 53 to function as a guide.

The two vibrators 51a and 51b of the vibration type motor are arranged so as to oppose to each other with the second guide bar 54 sandwiched therebetween, and are driven along the second guide bar 54 by their respective protruding portions making pressure contact with each other.

By applying a desired electric signal to the two vibrators 51a and 51b, driving forces are generated between the vibrators 51a and 51b and the guide bar 54. The lens holder 52 is driven by the driving forces.

While an example in which the vibration type driving apparatus is used for lens driving for automatic focusing of the imaging apparatus has been described in the present exemplary embodiment, an application of the present invention is not limited to this. For example, the vibration type driving apparatus can also be used to drive a lens holder for moving a zoom lens. Therefore, the vibration type driving apparatus according to an exemplary embodiment of the present invention is also applicable to an interchangeable lens in addition to an imaging apparatus, for lens driving. The vibration type driving apparatus can also be used to drive an image sensor, and can also be used to drive a lens and an image sensor during camera shake correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-100847 filed May 14, 2014 and No. 2015-077211 filed Apr. 3, 2015, which are hereby incorporated by reference herein in their entirety.

The invention claimed is:

1. A vibration type driving apparatus comprising:
   a first vibrator including an electro-mechanical energy conversion element and configured to be in pressure contact with a driven member;
   a second vibrator including an electro-mechanical energy conversion element and configured to be in pressure contact with the driven member;
   a third vibrator including an electro-mechanical energy conversion element and configured to be in pressure contact with the driven member;
   a first electric element connected with the second vibrator; and
   a second electric element connected with the third vibrator,
   wherein the first vibrator is connected to a driving circuit,
   wherein the second vibrator and the first electric element are connected in parallel with the first vibrator,
   wherein the second vibrator is connected to the driving circuit via the first electric element,
   wherein the third vibrator and the second electric element are connected in parallel with the second vibrator,
   wherein the third vibrator is connected to the driving circuit via the first electric element and the second electric element, and
   wherein a resonance frequency f1 of the first vibrator, a resonance frequency f2 of the second vibrator and a resonance frequency f3 of the third vibrator satisfy a relationship, $$f1 < f2 < f3. \qquad \text{[Math. 1]}$$

2. The vibration type driving apparatus according to claim 1, further comprising the driven member.

3. The vibration type driving apparatus according to claim 1, comprising the driving circuit.

4. The vibration type driving apparatus according to claim 1, wherein the first electric element is a capacitor.

5. The vibration type driving apparatus according to claim 1, wherein the second electric element is a capacitor.

6. The vibration type driving apparatus according to claim 1, wherein a value of an impedance of the first electric element is a value for reducing a difference between a speed of relative movement of the first vibrator and the driven member and a speed of relative movement of the second vibrator and the driven member, the difference arising from a difference in resonance frequency between the first vibrator and the second vibrator.

7. The vibration type driving apparatus according to claim 1,
   wherein a value of an impedance of the first electric element is a value based on a ratio V2/V1 of a driving voltage V1 of the first vibrator and a driving voltage V2 of the second vibrator, and
   wherein the ratio V2/V1 is a value for reducing a difference between a speed of relative movement of the first vibrator and the driven member and a speed of relative movement of the second vibrator and the driven member, the difference arising from a difference in resonance frequency between the first vibrator and the second vibrator, and the ratio V2/V1 satisfies a relationship, $$|V2/V1| < 1. \qquad \text{[Math. 5]}$$

8. The vibration type driving apparatus according to claim 1, wherein a value of an impedance of the second electric element is a value for reducing a difference between a speed of relative movement of the second vibrator and the driven member and a speed of relative movement of the third vibrator and the driven member, the difference arising from a difference in resonance frequency between the second vibrator and the third vibrator.

9. The vibration type driving apparatus according to claim 1,
   wherein a value of an impedance of the second electric element is a value based on a ratio V3/V2 of a driving voltage V2 of the second vibrator and a driving voltage V3 of the third vibrator, and
   wherein the ratio V3/V2 is a value for reducing a speed difference between the second vibrator and the third vibrator, and the ratio V3/V2 satisfies a relationship, $$|V3/V2| \leq 1. \qquad \text{[Math. 6]}$$

10. The vibration type driving apparatus according to claim 1, wherein the driving circuit includes a boosting unit having a transformer or a coil.

11. An interchangeable lens comprising:
    a lens;
    the vibration type driving apparatus according to claim 1, the vibration type driving apparatus being configured to drive a lens holding member for holding the lens, by driving the driven member;
    a position sensor configured to detect a position of the lens holding member; and
    a control device configured to perform control based on the detected position.

12. An imaging apparatus comprising:
    an image sensor;
    a lens;
    the vibration type driving apparatus according to claim 1, the vibration type driving apparatus being configured to drive a lens holding member for holding the lens, by driving the driven member;
    a position sensor configured to detect a position of the lens holding member; and
    a control device configured to perform control based on the detected position.

13. An imaging apparatus comprising:
    a lens;
    an image sensor;
    the vibration type driving apparatus according to claim 1, the vibration type driving apparatus being configured to drive the image sensor by driving the driven member;
    a position sensor configured to detect a position of the image sensor; and
    a control device configured to perform control based on the detected position.

14. A method for adjusting a vibration type motor including a first vibrator including an electro-mechanical energy conversion element and a second vibrator including an electro-mechanical energy conversion element and having a resonance frequency that is equal to or larger than a resonance frequency of the first vibrator, the first vibrator and the second vibrator being configured to be in pressure contact with one driven member,
    the method comprising:
    obtaining a speed ratio of the first vibrator and the second vibrator based on a difference in resonance frequency between the first vibrator and the second vibrator;

obtaining, based on the speed ratio, a voltage ratio which is a ratio of voltages respectively applied to the first vibrator and the second vibrator;

obtaining a circuit constant of a first electric element based on the voltage ratio; and arranging the first vibrator, the second vibrator, and the first electric element so that the first vibrator and the second vibrator are connected in parallel in this order from a driving circuit of the vibration type motor, the first electric element and the second vibrator are connected in series, and the second vibrator is connected to the driving circuit via the first electric element, wherein a resonance frequency f1 of the first vibrator and a resonance frequency f2 of the second vibrator satisfy a relationship, $$f1<f2. \qquad \text{[Math. 7]}$$

15. The method for adjusting the vibration type motor according to claim 14, wherein the first electric element is a capacitor.

16. The method for adjusting the vibration type motor according to claim 15, arranging a second electric element and a third vibrator which is configured to be in pressure contact with the one driven member so that the third vibrator and the second electric element are connected in series, and are connected in parallel with the second vibrator, and the third vibrator is connected to the driving circuit via the first electric element and the second electric element, and wherein a resonance frequency f3 of the third vibrator satisfy a relationship, $$f2<f3. \qquad \text{[Math. 8]}$$

17. The method for adjusting the vibration type motor according to claim 16, wherein the second electric element is a capacitor.

18. A vibration type driving apparatus comprising:

a first vibrator including an electro-mechanical energy conversion element and configured to be in contact with a driven member;

a second vibrator including an electro-mechanical energy conversion element and configured to be in contact with the driven member;

a third vibrator including an electro-mechanical energy conversion element and configured to be in contact with the driven member; and an electric element connected with the second vibrator, wherein the first vibrator is connected to a driving circuit, wherein the second vibrator and the electric element are connected in parallel with the first vibrator, wherein the second vibrator is connected to the driving circuit via the electric element, wherein the third vibrator is connected in parallel with the second vibrator, wherein the third vibrator is connected to the driving circuit via the electric element, and wherein a resonance frequency f1 of the first vibrator, a resonance frequency f2 of the second vibrator and a resonance frequency f3 of the third vibrator satisfy a relationship, $$f1<f2<f3. \qquad \text{[Math. 9]}$$

19. The vibration type driving apparatus according to claim 18, wherein the electric element is a capacitor.

20. The vibration type driving apparatus according to claim 18, wherein the driving circuit includes a boosting unit having a transformer or a coil.

21. A vibration type driving apparatus comprising:

a first vibrator including an electro-mechanical energy conversion element and configured to be in contact with a driven member;

a second vibrator including an electro-mechanical energy conversion element and configured to be in contact with the driven member; and an electric element connected in series with the second vibrator, wherein the first vibrator is connected to a driving circuit, wherein the second vibrator and the electric element are connected in parallel with the first vibrator, wherein the second vibrator is connected to the driving circuit via the electric element, wherein the electric element is a capacitor or a resistor, and wherein a resonance frequency f1 of the first vibrator and a resonance frequency f2 of the second vibrator satisfy a relationship, $$f1<f2. \qquad \text{[Math. 10]}$$

* * * * *